July 1, 1930.  A. E. WATTERS ET AL  1,769,046

SPRAYING DEVICE

Filed Sept. 17, 1928

Inventors
A. E. Watters.
H. E. Harbo.
By Whiteley and Ruckman
Attorneys.

Patented July 1, 1930

1,769,046

UNITED STATES PATENT OFFICE

ALBERT E. WATTERS AND HAROLD E. HARBO, OF MINNEAPOLIS, MINNESOTA

SPRAYING DEVICE

Application filed September 17, 1928. Serial No. 306,310.

Our invention relates to spraying devices and while intended particularly for spraying water for sprinkling purposes, it is to be understood that it may be used for spraying other liquids. Among the objects of the invention is the provision of a device which will not only break up the liquid into a fine spray but will also deliver the spray over a large area. We accomplish the objects of our invention by providing a casing having an entrance for liquid in the lower portion thereof with a partition member extending across the casing between the entrance and the top of the casing, the partition member being reduced on its two opposite sides to provide passages and with oppositely disposed wings extending along the margin of the partition member for more than half its length with the inner ends of the wings curled inwardly and the top of the casing provided with a central discharge perforation.

The full objects and advantages of our invention will appear in connection with the detailed description thereof, and the novel features of our inventive idea will be particularly pointed out in the claim.

In the accompanying drawings which illustrate a practical embodiment of our invention,—

Figure 1:
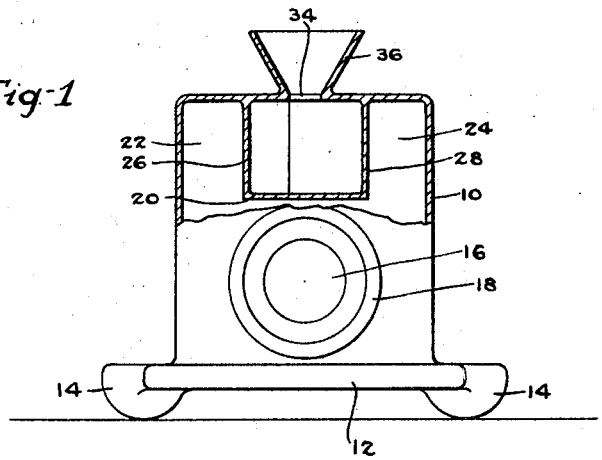
Figure 2:
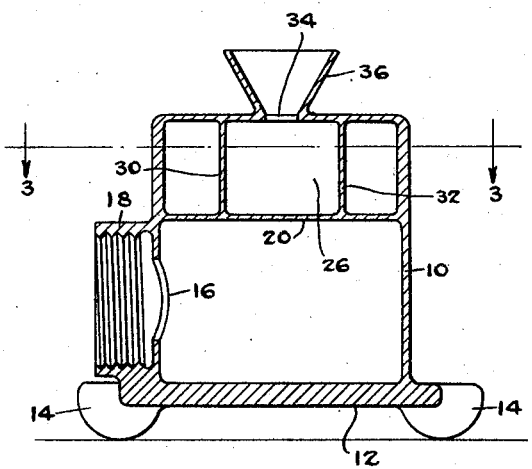
Figure 3:
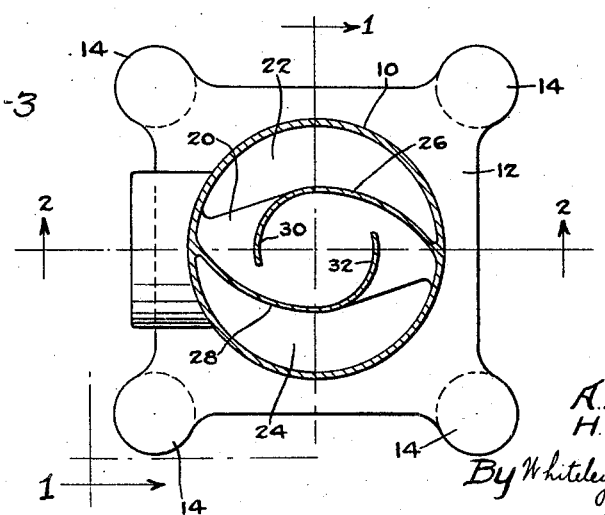

Fig. 1 is an elevational sectional view on line 1—1 of Fig. 3. Fig. 2 is a view in vertical section on the line 2—2 of Fig. 3. Fig. 3 is a view in horizontal section on the line 3—3 of Fig. 2.

Referring to the construction shown in the drawings, the numeral 10 designates a cylindrical casing which may conveniently be made of cast metal. This casing is closed at its bottom by a base member 12 supported on feet 14 so that the device will rest firmly on the ground. The lower portion of the casing 10 is provided with a lateral hole 16 which is surrounded by an outwardly extending internally screw-threaded nipple 18 which serves for attachment of a hose. A partition member 20 extends across the casing above the hole 16. The partition member 20 has the shape shown in Fig. 3 being reduced on its two opposite sides and with curved margins whereby crescent shaped passages 22 and 24 are provided at two opposite sides of the casing for upward passage of the water or other liquid to be sprayed. Two oppositely disposed curved wings 26 and 28 extend between the partition member 20 and the top of the casing 10. These wings start at the inner surface of the casing 10 and after following the margins of the member 20 for more than half its length have their inner end portions curled inwardly as indicated at 30 and 32 in Fig. 3 with their extreme ends stopping short of the other wing respectively so as to provide entrance for the water into the central portion of the casing. The top member of the casing 10 is provided with a central perforation 34 which is surrounded by an outwardly extending funnel-shaped member 36.

The operation and advantages of our invention will be understood in connection with the foregoing description. Water or other liquid to be sprayed enters the lower portion of the casing 10 through the nipple 18 and after passing up through openings 22 and 24 flows into the interior space between the two wings 26 and 28 whose shape gives the liquid a whirling motion in a counter-clockwise direction as viewed in Fig. 3. The liquid is then forced out through the discharge perforation 34 and is broken up into a fine spray by its centrifugal movement combined with the action of the funnel member 36, the spray being distributed over a large area.

We claim:

A spraying device comprising a casing having a cylindrical wall, a base member closing the bottom of said casing, rounded feet projecting from said base member for supporting the device on the ground, a nipple extending out laterally from the lower portion of said casing for providing an entrance for liquid thereinto, a partition member extending across said casing between said entrance and the bottom of the casing, said partition member being reduced on two opposite sides to produce passages, and oppositely disposed wings struck inwardly from said cylindrical wall extending upwardly from and along the margins of said partitions for more than half their length with each of the inner ends of said wings curled inwardly and stopping short of the main portion of the other wing, the upper edges of said wings joining the top of said casing to provide a whirl chamber, said top being provided with a central discharge perforation in communication with said chamber.

In testimony whereof we hereunto affix our signatures.

ALBERT E. WATTERS.
HAROLD E. HARBO.